(12) United States Patent
Wang et al.

(10) Patent No.: US 12,425,805 B2
(45) Date of Patent: *Sep. 23, 2025

(54) DEVICES, SYSTEMS AND METHODS FOR DETECTING LOCATIONS OF WIRELESS COMMUNICATION DEVICES

(71) Applicant: WITAGG, INC., Los Altos, CA (US)

(72) Inventors: Jing Wang, Los Altos, CA (US); Hongjun Zhu, Los Altos, CA (US)

(73) Assignee: WITAGG, INC.

( * ) Notice: Subject to any disclaimer, the term of this patent is extended or adjusted under 35 U.S.C. 154(b) by 371 days.

This patent is subject to a terminal disclaimer.

(21) Appl. No.: 18/009,285

(22) PCT Filed: Jun. 8, 2021

(86) PCT No.: PCT/US2021/036291
§ 371 (c)(1),
(2) Date: Dec. 8, 2022

(87) PCT Pub. No.: WO2021/252415
PCT Pub. Date: Dec. 16, 2021

(65) Prior Publication Data
US 2023/0221399 A1 Jul. 13, 2023

Related U.S. Application Data

(60) Provisional application No. 63/036,867, filed on Jun. 9, 2020.

(51) Int. Cl.
*H04W 4/029* (2018.01)
*G01S 3/14* (2006.01)
(Continued)

(52) U.S. Cl.
CPC .............. *H04W 4/029* (2018.02); *G01S 3/14* (2013.01); *G01S 5/0242* (2013.01); *G01S 5/0249* (2020.05); *G01S 5/08* (2013.01)

(58) Field of Classification Search
CPC ......... H04W 4/029; H04W 4/33; H04W 4/38; H04W 4/80; H04W 4/025; G01S 3/14; (Continued)

(56) References Cited

U.S. PATENT DOCUMENTS

2003/0234741 A1 12/2003 Rogers et al.
2010/0309051 A1 12/2010 Moshfeghi
(Continued)

OTHER PUBLICATIONS

International Search Report and Written Opinion dated Sep. 16, 2021, issued in corresponding International Patent Application No. PCT/US2021/036291.
(Continued)

*Primary Examiner* — Marcos L Torres
(74) *Attorney, Agent, or Firm* — DLA PIPER LLP (US); Blake W. Jackson; Thomas J. Fuller

(57) ABSTRACT

A device for estimating a fixed position of a wireless communication is provided. The device comprises a radio connected to an antenna array, a memory and a process. The radio can receive a first signal transmitted from a first direction by the wireless communication device to the movable device, and a second signal transmitted from a second direction by the wireless communication device to the movable device. The processor can calculate a first angle of arrival (AOA) a second AOA. The processor can estimate the fixed position of the wireless communication device based on the first AOA, the second AOA, the first position and the second position.

17 Claims, 9 Drawing Sheets

(51) Int. Cl.
*G01S 5/02* (2010.01)
*G01S 5/08* (2006.01)

(58) Field of Classification Search
CPC ........ G01S 5/0242; G01S 5/0249; G01S 5/08; G01S 5/04; G01S 5/12
See application file for complete search history.

(56) References Cited

U.S. PATENT DOCUMENTS

| | | | |
|---|---|---|---|
| 2012/0313816 A1* | 12/2012 | Menegozzi | G01S 11/04 342/451 |
| 2019/0110272 A1* | 4/2019 | Pereira Da Silva | H04B 17/318 |
| 2019/0363843 A1 | 11/2019 | Gordaychik | |
| 2020/0072982 A1* | 3/2020 | Clymer | G01S 19/17 |
| 2022/0187412 A1* | 6/2022 | Nakajima | H04W 4/029 |

OTHER PUBLICATIONS

International Preliminary Report on Patentability dated Dec. 13, 2022, issued in corresponding International Patent Application No. PCT/US2021/036291.

\* cited by examiner

DEVICES, SYSTEMS AND METHODS FOR DETECTING LOCATIONS OF WIRELESS COMMUNICATION DEVICES

CROSS-REFERENCE TO RELATED APPLICATION

This application is a U.S. national phase entry under 35 U.S.C. § 371 from PCT International Application No. PCT/US2021/036291 filed on Jun. 8, 2021, which is based upon and claims priority to U.S. Provisional Patent Application No. 63/036,867 filed on Jun. 9, 2020 The above applications are incorporated herein in their entirety by reference.

TECHNICAL FIELD

The present disclosure relates generally to mobile devices or movable devices, and more particularly, to allowing a mobile device or a movable device to use advanced directional finding technologies to map any wireless access points (APs), beacons, anchors or base stations.

BACKGROUND

High Accuracy Positioning is critical for a variety of services such as indoor navigation, public safety, asset tracking and social and digital marketing. Wireless technologies, like Wi-Fi, Bluetooth Low Energy (BLE) and Ultra-wideband (UWB), are widely available for Internet of Things (IoT) and Mobile communications. They also can be used as a cost-effective way for mobile device positioning. For example, Wi-Fi, Bluetooth and other similar wireless technologies has been used for positioning a mobile device along with GPS or camera-based solutions. In another example, smart phones may provide a GPS+ feature that uses Wi-Fi signals to enhance the GPS results, and a robot may use SLAM technology to fuse objects recognized by cameras with Wi-Fi/Bluetooth signals to generate a feature map to track its positioning and routes.

The existing solutions of using the wireless technologies to provide positioning service have various problems such as low accuracy, hard to setup or implement, time consuming, complex design of equipment, etc. So far, no solution has been undertaken to estimate the wireless communication device comprising an AP or beacon by using high accuracy Angle of Arrival (AOA) or Angle of Departure (AOD) technology.

Thus, it would be desirable to develop devices, systems, and methods that take into account at least some of the issues discussed above, as well as other possible issues.

SUMMARY

This disclosure will use a more accurate positioning mechanism, signal's angle of arrivals (AOA) or angle of departure (AOD) to map the location of any Wi-Fi APs or Bluetooth beacons. The mapped location can be used as anchor information for other mobile devices to position themselves.

Exemplary implementations of the present disclosure are directed to allowing a mobile device or a movable device to use advanced directional finding technologies to map any wireless access points (APs), beacons, anchors or base stations. The present disclosure can be used in the circumstance where location services are utilized to facilitate the business operations or personal usage, including airports, exhibition halls, underground markets, schools, hospitals, factories, warehouse, shopping malls, cinemas, music halls, railway stations, train stations, theme parks, hotels and restaurants, plazas etc. This disclosure can help Location Service Providers to create a more accurate location information database for Wi-Fi APs, Bluetooth beacons, cellular base stations, and any other types of wireless anchors. It also can be incorporated in a handset device or mobile device for high accuracy positioning.

Exemplary implementations use a movable device. The movable device refers to any device which can move, either automatically or manually, from one location to other locations, such as a robot vacuum cleaner, a scanner, a mobile phone, a TV controller, a service robot, a logistic robot, an automobile, a drone, wearable clothes, a smart watch, a laptop, a smart tablet, a headset, a RF tag, a door badge etc. The movable device can be put into a backpack or a container carried by a person, a pet, a drone, a shopping cart, an autonomous robot, a vehicle (including self-driving vehicle), etc. The movable device comprises a plurality of components to estimate the fixed position of a wireless communication device being deployed in a fixed position. Exemplary implementations can receive signals transmitted from the wireless communication device being deployed at a fix position by a radio of the movable device. Exemplary implementations can calculate a first AOA based on a first signal and a second AOA based on a second signal. Exemplary implementations can calculate coordinates indicating the fixed position of the wireless communication device.

Exemplary implementations of this disclosure can provide multiple advantages over existing solutions. The fixed positions of communication devices, some of which comprise Wi-Fi APs and/or Bluetooth beacons, can be collected with fewer steps and higher accuracies. Exemplary implementations of this disclosure can be integrated into a movable device, like mobile phones, smart watches, laptops, smart tablets, handsets, robots, drones, autonomous guided vehicles, scanners, vacuum cleaners, etc., so that any existing Wi-Fi/Bluetooth infrastructure can be improved with high accuracy positioning features for these movable devices. For example, the use of AOA/AOD approach in some exemplary implementations can bring about highly accurate calculations and it can be easily installed on a movable device. In some exemplary implementations, only 2 positioning measurements are needed to get the accurate position of an AP in one-meter level (within one-meter accuracy). By combining AOA/AOD and TOF or RSS together in some exemplary implementations, even only one measurement is needed to determine more accurate X/Y coordinate of an AP or beacon location. For example, by using RSS to determine location alone, the accuracy level is about 10-20 meters. By using AOA/AOD or TOF to determine the location, the accuracy level is 1-3 meters. While using TOF, both the scanning device and the AP/Beacon must support and have capability of measuring TOF parameters. While using AOA/AOD calculations, only one device needs to have the capability to measure AOA/AOD.

This disclosure can measure signals transmitted by AP/Beacon in two ways. One way is to scan in static points, which can provide accurate results. The static scan points measurement can choose a list of locations with known location coordinates at which the movable device can scan the transmitted signals. The other way is to scan with walking tracks, which can provide faster positioning results. The walking track measurement can enable a person, a vehicle or a robot to carry the movable device. The person, vehicle or robot starts at a known starting point, then walks or moves in the site of a map or a floorplan. The movable device uses equipped PDR sensors to get the travel directions and distance from the previous location to the next location. The PDR sensors can constantly calculate the current location coordinates and report back to the map engine.

This disclosure can provide a map or database with the accurate fixed positions of the wireless communication devices which are estimated by this disclosure. In some implementations, the wireless communication devices may comprise Wi-Fi APs and/or Bluetooth beacons. The movable device may be equipped to have the AOA measuring capabilities as well. When the movable device having the AOA capabilities is deployed in the map, it can accurately detect the relative position between itself and the fixed positions of the wireless communication devices in the map, and then calculate its own position based on the information of the wireless communication devices. The accuracy level to locate the new movable device with the AOA capabilities by using the map or database is 2-6 meters. If the new movable device does not have the AOA capabilities but having the RSS capability, the position of the new movable device can be determined with the accuracy level of 5-10 meters.

The present disclosure thus includes, without limitation, the following exemplary implementations.

Some exemplary implementations provide a movable device, comprising a radio connected to an antenna array, a memory and a processor. The radio is configured to receive, by the movable device at a first position, a first signal transmitted from a first direction from a wireless communication device to the movable device. The wireless communication device is deployed at a fixed position. The radio is also configured to receive, by the movable device at a second position, a second signal transmitted from a second direction by the wireless communication device to the movable device. The processor is configured to calculate a first angle of arrival (AOA) based on the first signal and a reference direction, and a second AOA based on the second signal and the reference direction. The first AOA is defined by the first direction and the reference direction, and the second AOA is defined by the second direction and the reference direction. The processor is also configured to estimate the fixed position of the wireless communication device based on the first AOA, the second AOA, the first position and the second position.

In some exemplary implementations or any combination of preceding exemplary implementations of the movable device, the reference direction is parallel or perpendicular to a facing direction of the antenna array.

In some exemplary implementations or any combination of preceding exemplary implementations of the movable device, the wireless communication device comprises a Wi-Fi access point or a bluetooth beacon.

In some exemplary implementations or any combination of preceding exemplary implementations of the movable device, the movable device further comprises a Global Positioning System (GPS) sensor or a pedestrian dead reckoning (PDR) sensor. The processor is further configured to obtain the first position and the second position using the GPS sensor or the PDR sensor. The movable device can be a wearable device that can be put on the wrist. For example, the movable device can be put on a smart watch.

In some exemplary implementations or any combination of preceding exemplary implementations of the movable device, the first signal and the second signal comprise information indicating received signal strength indicator (RSSI), basic service set identifier (BSSID), channel state information (CSI) and/or I/Q data received at the first position and second position respectively.

In some exemplary implementations or any combination of preceding exemplary implementations of the movable device, the processor is further configured to store the fix position of the wireless communication device and the first signal including a basic service set identifier (BSSID) of the wireless communication device into a database stored in the memory.

In some exemplary implementations or any combination of preceding exemplary implementations of the movable device, the processor being configured to estimate the fixed position of the wireless communication device includes being configured to calculate coordinates indicating the fixed position of the wireless communication device based on the first AOA, the second AOA, the first position and the second position.

Some exemplary implementations provide a movable device, comprising a radio connected to an antenna array, a memory and a processor. The radio is configured to receive, by the movable device at a first position, a signal transmitted from a transmission direction by a wireless communication device to the movable device. The wireless communication device is deployed at a fixed position. The signal comprises information indicating received signal strength indicator (RSSI) and channel state information (CSI) received at the first position. The processor is configured to calculate an angle of arrival (AOA) based on the signal, a reference direction and RSSI. The AOA is defined by the transmission direction and the reference direction. The processor is also configured to estimate the fixed position of the wireless communication device based on the AOA, RSSI and the first position.

Some exemplary implementations provide a database comprising the positions of one or more wireless communication devices. The positions of the one or more wireless communication devices are estimated by a movable device according to some exemplary implementations or any combination of preceding exemplary implementations.

Some exemplary implementations provide a system, comprising at least one wireless communication device deployed at a fixed position and a movable device. The movable device comprises a radio connected to an antenna array, a memory and a processor. The radio is configured to receive, by the movable device at a first position, a first signal transmitted from a first direction by the at least one wireless communication device to the movable device. The at least one wireless communication device is deployed at a fixed position. The radio is also configured to receive, by the movable device at a second position, a second signal transmitted from a second direction by the at least one wireless communication device to the movable device. The processor is configured to calculate a first angle of arrival (AOA) based on the first signal and a reference direction. The processor is also configured to calculate a second AOA based on the second signal and the reference direction. The first AOA is defined by the first direction and the reference direction, and the second AOA is defined by the second direction and the reference direction. The processor is configured to estimate the fixed position of the wireless communication device based on the first AOA, the second AOA, the first position and the second position.

Some exemplary implementations provide a method comprising receiving, by a movable device at a first position, a first signal transmitted from a first direction by a wireless communication device to the movable device, the wireless communication device being deployed at a fixed position;

receiving, by the movable device at a second position, a second signal transmitted from a second direction by the wireless communication device to the movable device; calculating, by the movable device, a first angle of arrival (AOA) based on the first signal and a reference direction, and a second AOA based on the second signal and the reference direction, wherein the first AOA is defined by the first direction and the reference direction, and the second AOA is defined by the second direction and the reference direction; and estimating the fixed position of the wireless communication device based on the first AOA, the second AOA, the first position and the second position.

These and other features, aspects, and advantages of the present disclosure will be apparent from a reading of the following detailed description together with the accompanying figures, which are briefly described below. The present disclosure includes any combination of two or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and exemplary implementations, should be viewed as combinable unless the context of the disclosure clearly dictates otherwise.

It will therefore be appreciated that this Brief Summary is provided merely for purposes of summarizing some exemplary implementations so as to provide a basic understanding of some aspects of the disclosure. Accordingly, it will be appreciated that the above described exemplary implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described exemplary implementations.

BRIEF DESCRIPTION OF THE DRAWINGS

Figure 1:
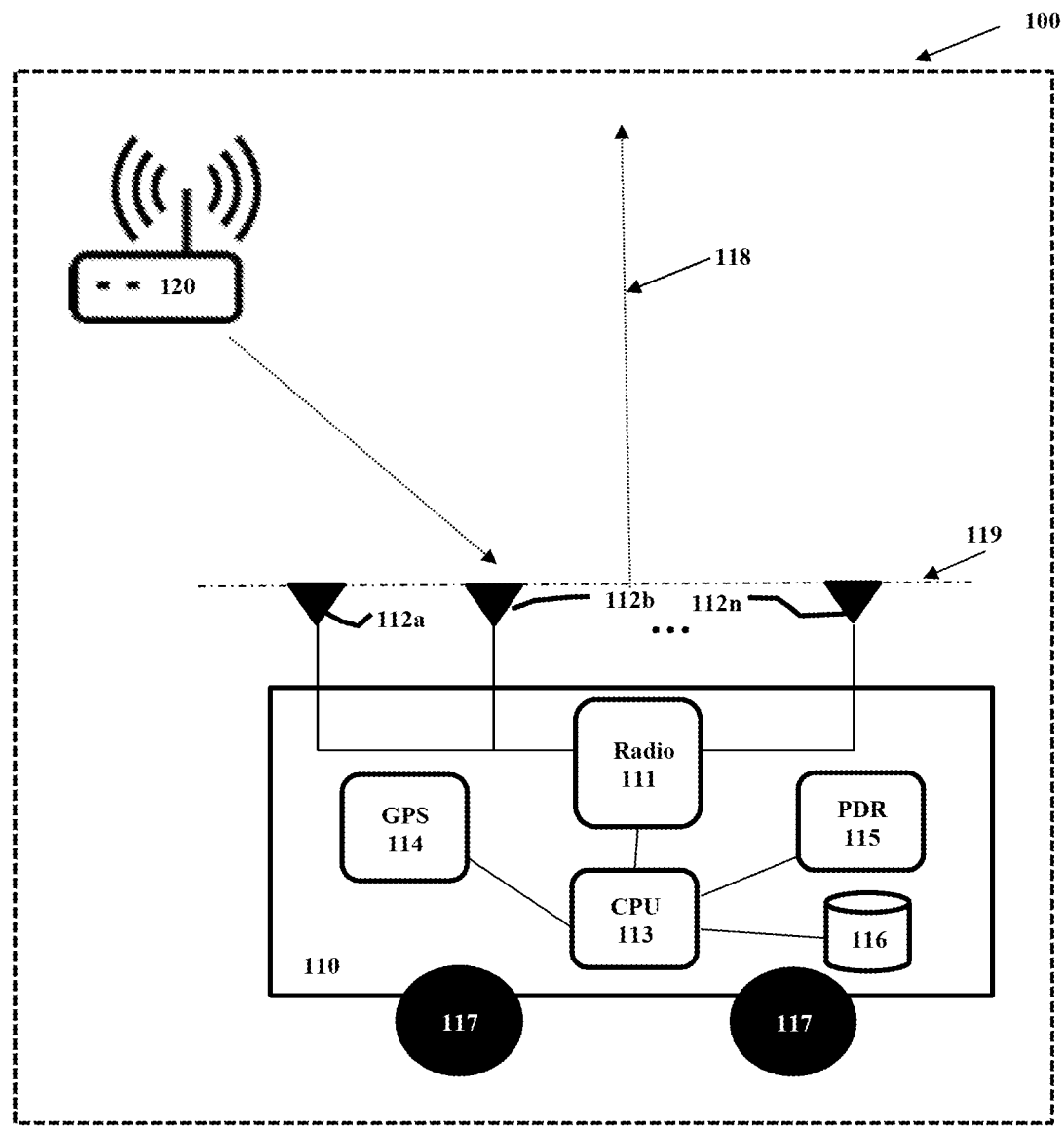
Figure 2:
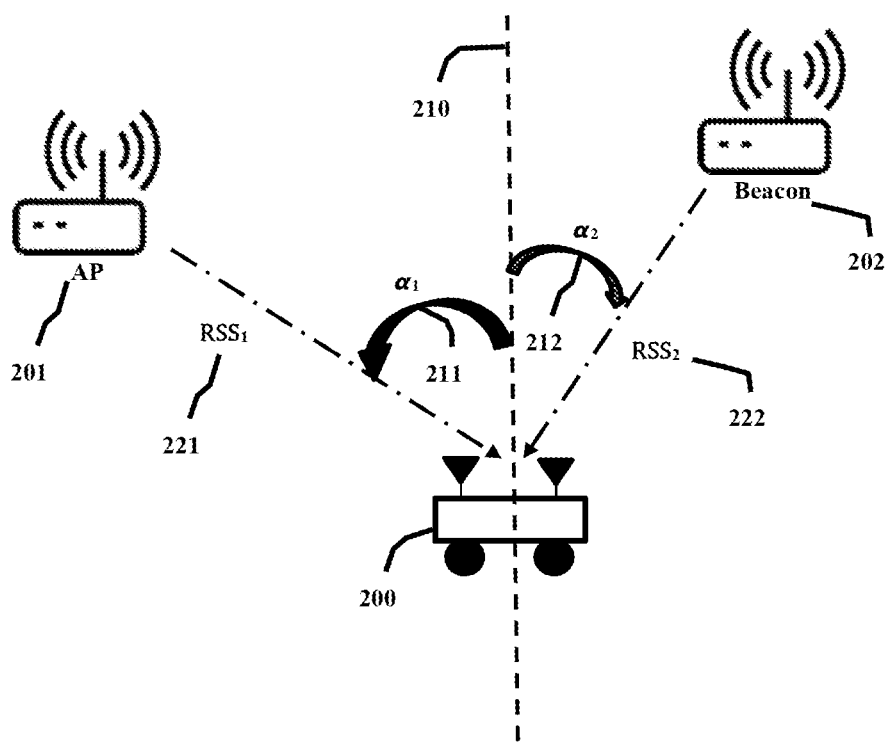
Figure 3:
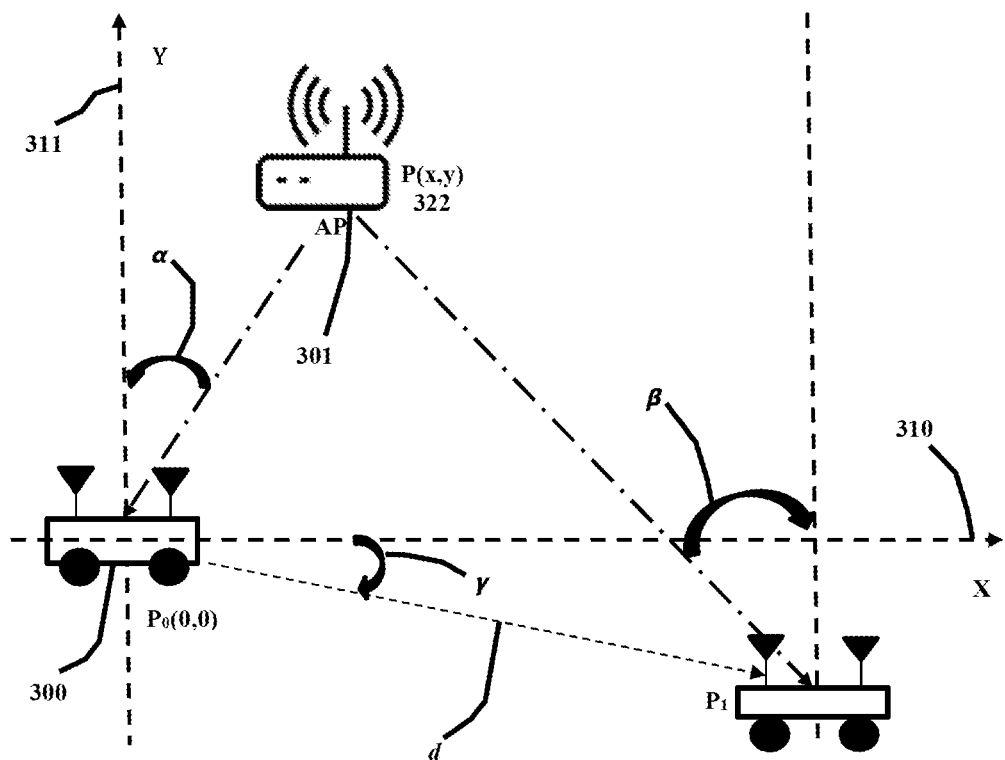
Figure 4:
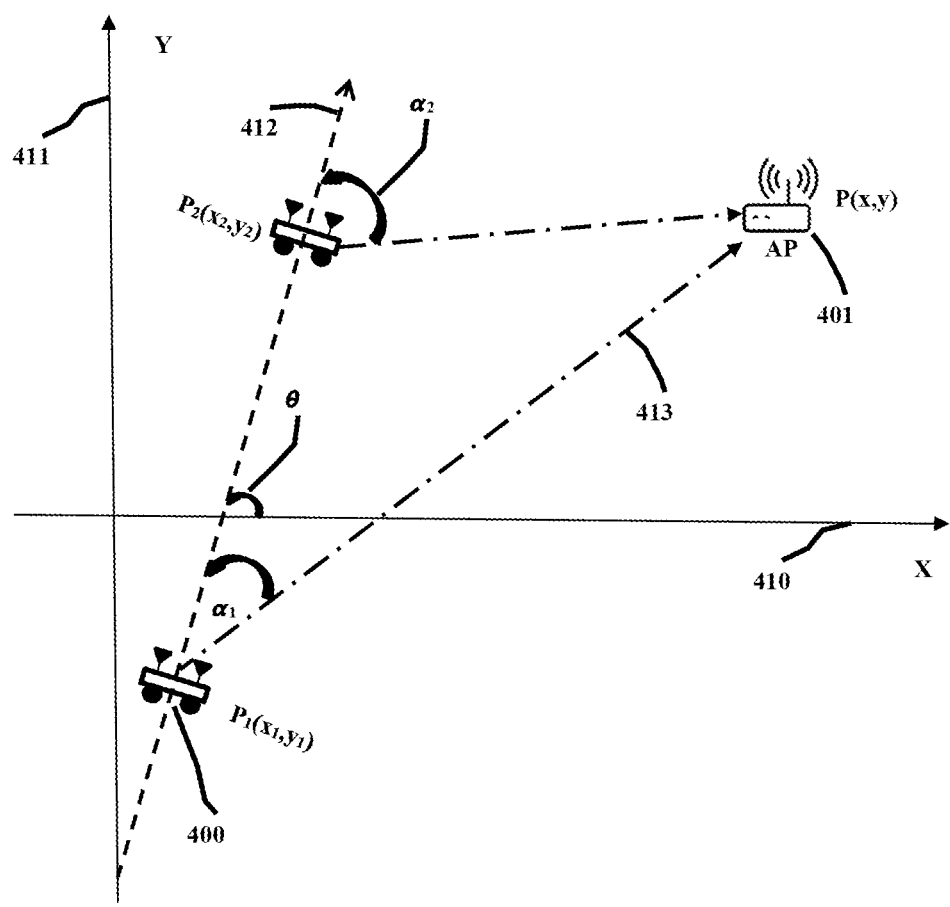
Figure 5:
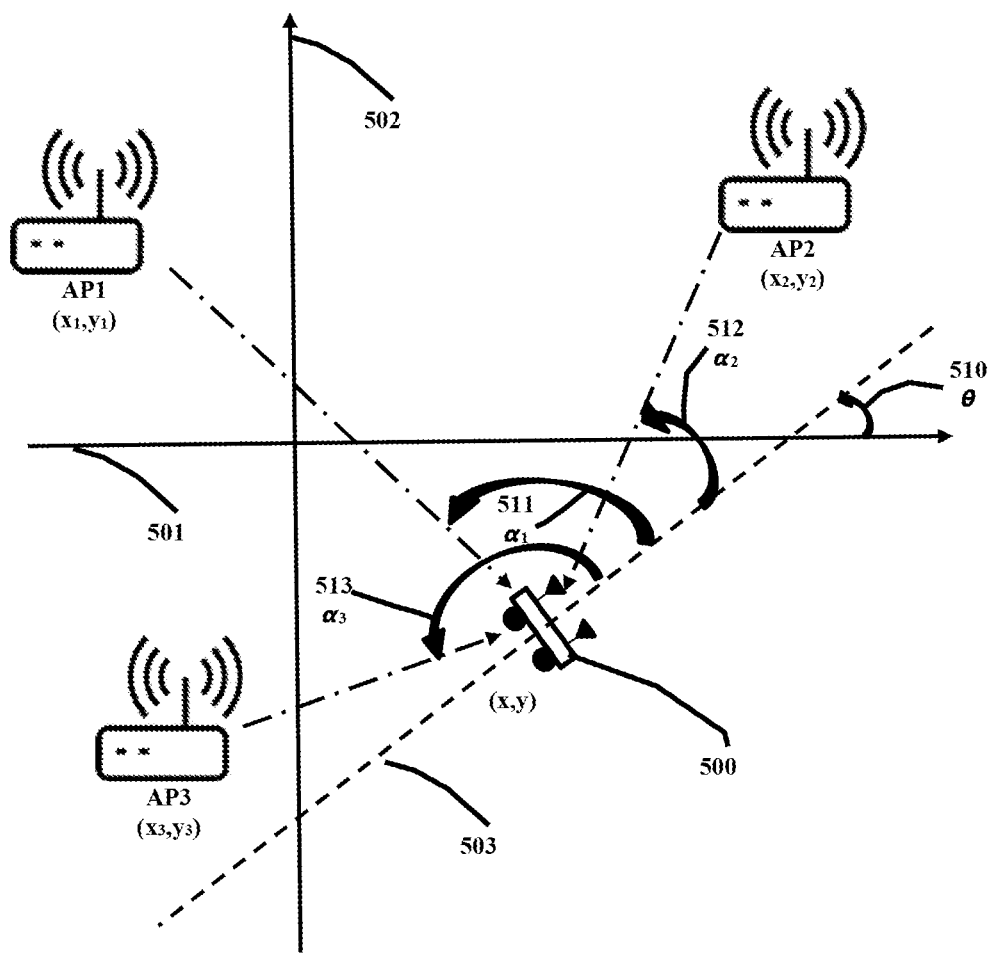
Figure 6A:
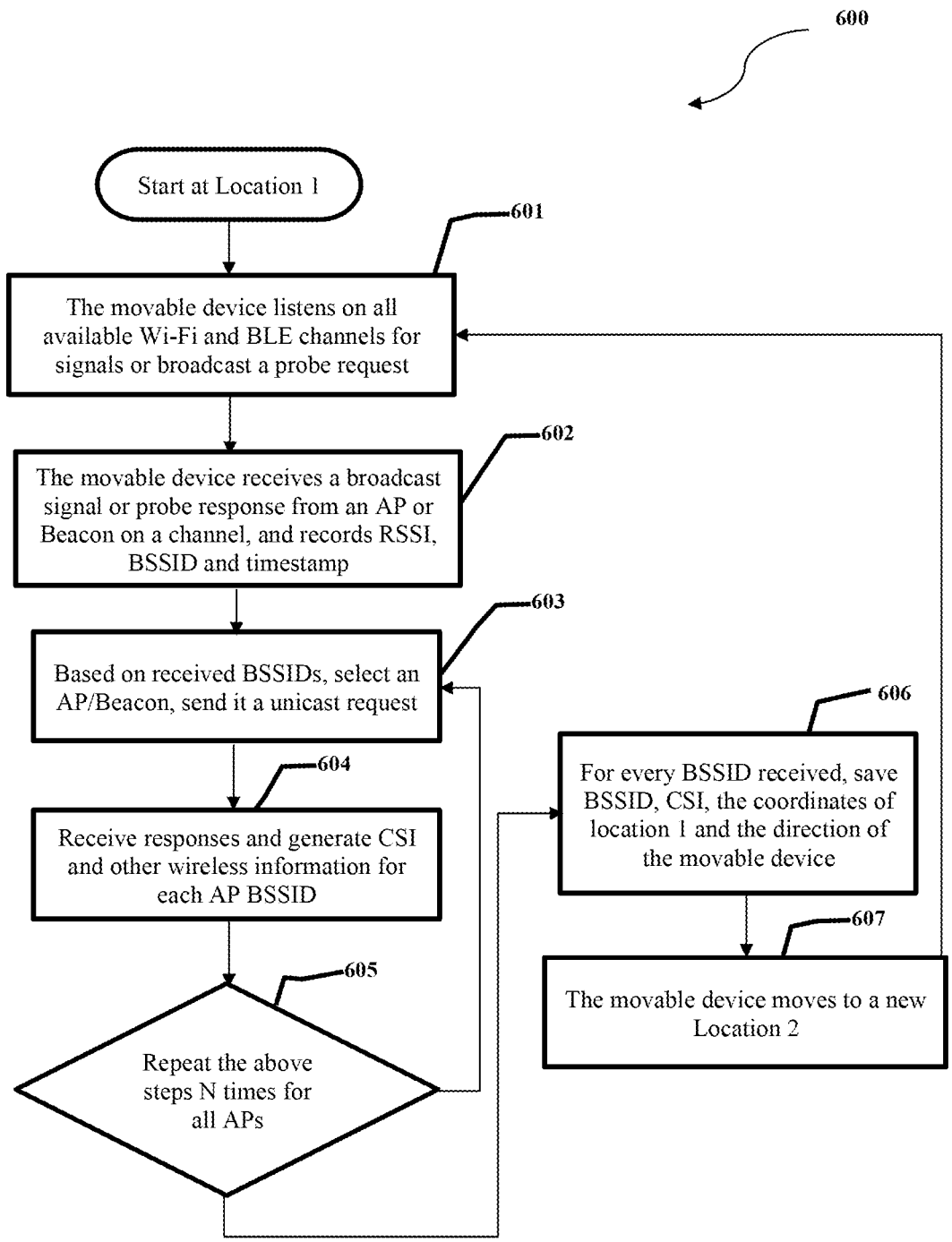
Figure 6B:
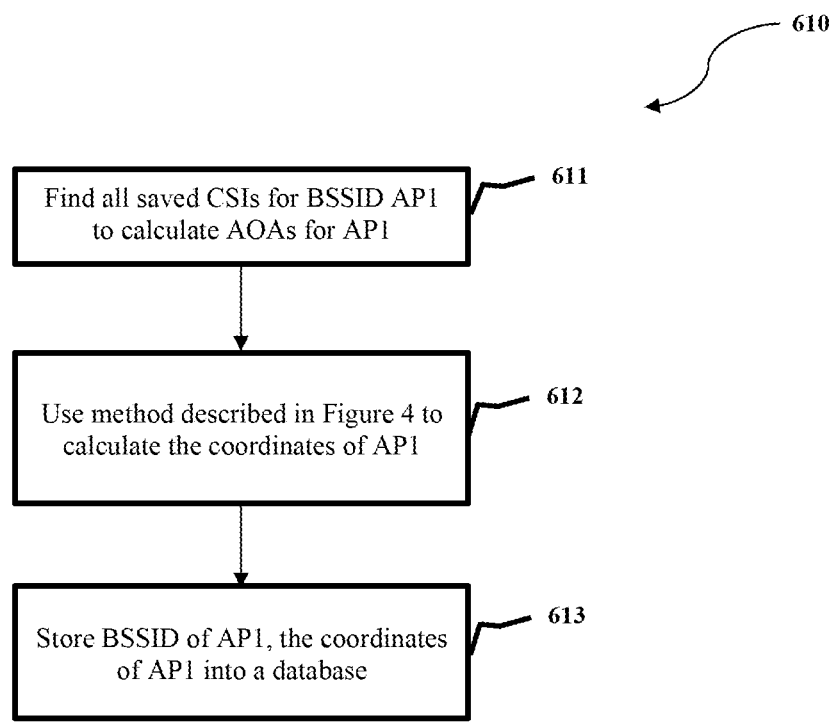
Figure 7:
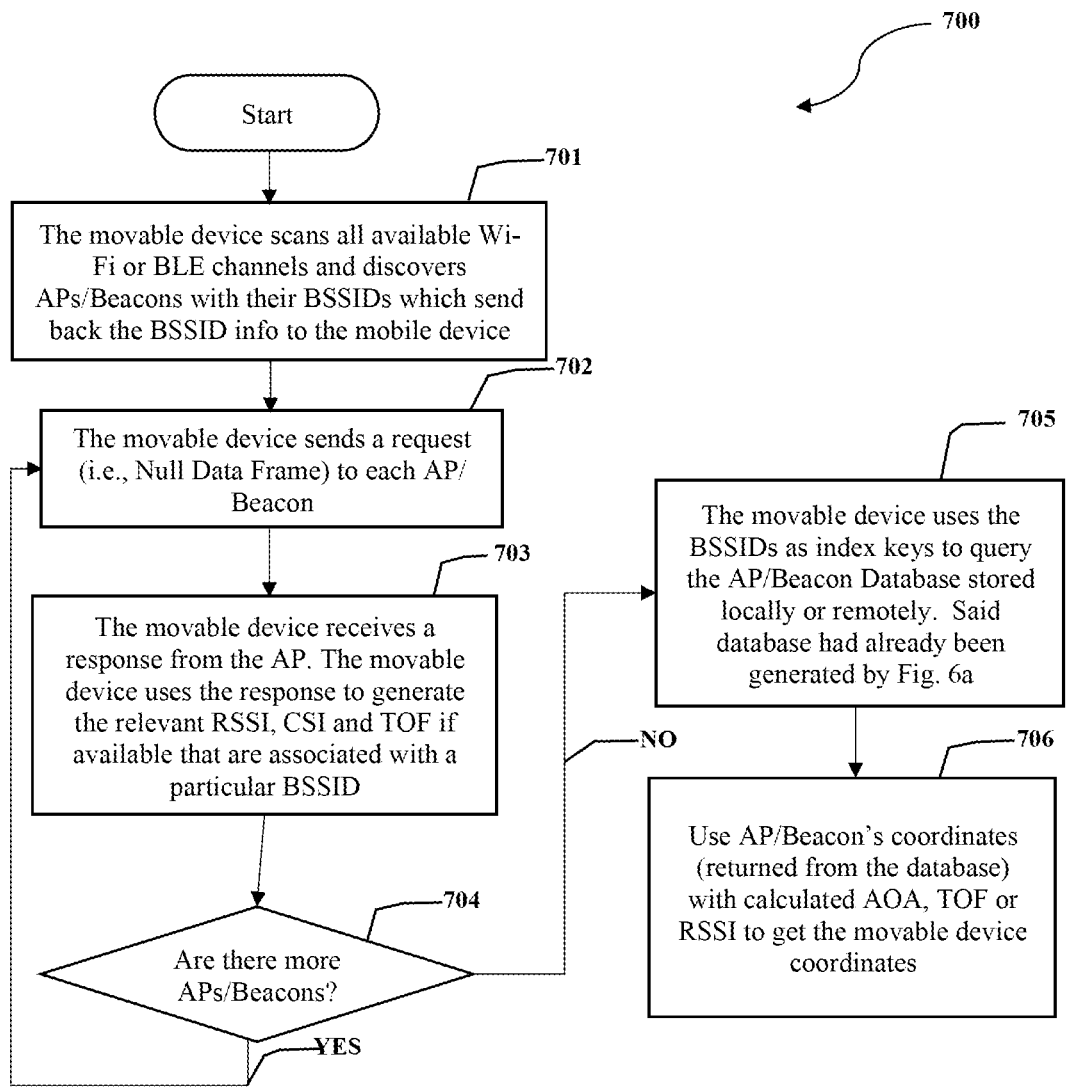
Figure 8:
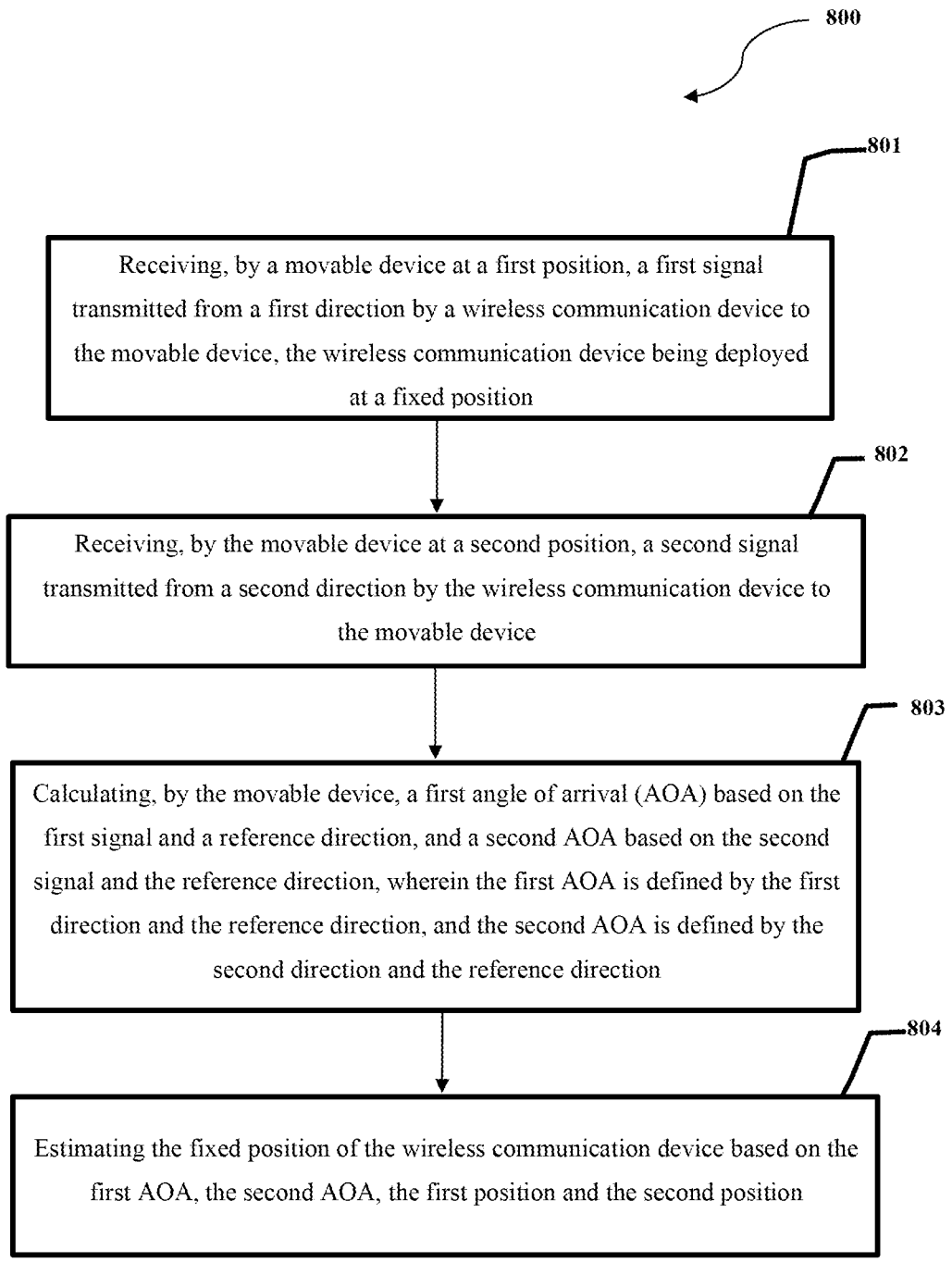

Having thus described exemplary implementations of the disclosure in general terms, reference will now be made to the accompanying figures, which are not necessarily drawn to scale, and wherein:

FIG. 1 illustrates a system comprising a movable device and a wireless communication device, according to exemplary implementations of the present disclosure;

FIG. 2 illustrates a movable device using AOA to estimate positions of one or more wireless communication devices, according to exemplary implementations of the present disclosure;

FIG. 3 illustrates a movable device using PDR sensors to estimate position of a wireless communication device, according to exemplary implementations of the present disclosure;

FIG. 4 illustrates a movable device using a map or a floorplan to estimate position of a wireless communication system, according to exemplary implementations of the present disclosure;

FIG. 5 illustrates a method to estimate the position of a new movable device using a database, which has mapped the coordinates of fixed positions of wireless communication devices, according to exemplary implementations of the present disclosure;

FIG. 6a illustrates a flowchart illustrating the collection of signal data of a wireless communication device in an exemplary method, according to exemplary implementations of the present disclosure;

FIG. 6b illustrates a flowchart illustrating the generation of a database using the signal data collected by the wireless communication device in an exemplary method, according to other exemplary implementations of the present disclosure;

FIG. 7 illustrates a flowchart illustrating the estimation of the position of a new movable device in an exemplary method, according to exemplary implementations of the present disclosure; and FIG. 8 illustrates a flowchart illustrating the estimation of the position of a wireless communication device in an exemplary method, according to exemplary implementations of the present disclosure.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these exemplary implementations are provided so that this disclosure will be thorough and complete, and will fully convey the scope of the disclosure to those skilled in the art. For example, unless otherwise indicated, reference to something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Exemplary implementations of the present disclosure are generally directed to mobile devices, and more particularly, to allowing a mobile device to use advanced directional finding technologies to map any wireless access points (APs), beacons, anchors or base stations. It should be understood that the methods, device, and systems are applicable to any of a number of circumstances such as airports, exhibition halls, underground markets, schools, hospitals, factories, and warehouse or the like.

In this disclosure, using AOA/AOD alone as well as combining with RSS or PDR together can be used to determine a location of an AP/Beacon. Using TOF technology to replace RSS based distance estimation can be used to improve the accuracy when TOF is available.

FIG. 1 illustrates an exemplary system 100 comprising a movable device 110 and a wireless communication device 120, according to exemplary implementations of the present disclosure. As shown, in some embodiments, the movable device 110 comprises a radio 111. The radio 111 is capable of signaling and communicating through radio waves. Radio waves may be generated by a radio transmitter connected to an antenna, and may be received by another antenna connected to a radio receiver. In addition, the radio waves may carry information across space from the radio transmitter to the radio receiver. The radio 111 may be used in various communications, including radio and television broadcasting, mobile phones, wireless networking, two-way radios, and satellite communication. For example, as shown in FIG. 1, the radio 111 can be used in the communication with the wireless communication device 120. In one example, the radio 111 may comprise a radio chipset. For example, as shown in FIG. 1, the radio chipset may measure and/or generate information, among others, indicating channel state information (CSI), receiving signal strength indication (RSSI), Basic Service Set Identifier (BSSID), and/or timestamps.

In one exemplary implementation, the radio 111 is configured to receive, by the movable device 110 at a first position, a first signal transmitted from a first direction by the wireless communication device 120 to the movable device 110. The first direction may be the direction from the wireless communication device 120 to the movable device 110 when the movable device 110 is at the first position. The wireless communication device is deployed at a fixed position. In this exemplary implementation, the radio 111 is configured to receive, by the movable device 110 at the second position, a second signal transmitted from a second direction by the wireless communication device 120 to the movable device 110. The second direction may be the direction from the wireless communication device 120 to the movable device 110 when the movable device 110 is at the second position. For example, as shown in FIG. 1, the wireless communication device 120 is deployed in a fixed position. The wireless communication device 120 may also be anchored to a relatively identifiable location, which can be identified by its geographical GPS coordinates, or a relatively position/distance to another known location such as a fixed spot on the ship or within an airport or exhibition hall. The wireless communication device 120 may include one of more of Wi-Fi, Bluetooth, WiMax, Ultra-wideband, LoRa, Zigbee, or 4G/5G devices, and can communicate with the movable device 110. When the wireless communication device 120 transmits the first signal in the fixed position, the movable device 110 may be at the first position and may receive the first signal transmitted from the first direction by the wireless communication device 120 via the radio 111. Then the movable device 110 may move to the second position, and may receive the second signal transmitted from the second direction by the wireless communication device 120 via the radio 111.

Wi-Fi may refer to a family of wireless networking technologies, based on the IEEE 802.11 family of standards, which are commonly used for local area networking of devices and Internet access.

BLE may refer to a wireless personal area network technology designed and marketed by the Bluetooth Special Interest Group.

WiMAX (Worldwide Interoperability for Microwave Access) may refer to a family of wireless broadband communication standards based on the IEEE 802.16 set of standards, which provide multiple physical layer (PHY) and Media Access Control (MAC) options.

Ultra-wideband (also known as UWB, ultra-wide band and ultraband) may refer to a radio technology that can use a very low energy level for short-range, high-bandwidth communications over a large portion of the radio spectrum.

LoRa (Long Range) may refer to a low-power wide-area network (LPWAN) protocol developed by Semtech. It is based on spread spectrum modulation techniques derived from chirp spread spectrum (CSS) technology.

Zigbee may refer to an IEEE 802.15.4-based specification for a suite of high-level communication protocols used to create personal area networks with small, low-power digital radios, such as for home automation, medical device data collection, and other low-power low-bandwidth needs, designed for small scale projects which need wireless connection.

4G/5G may refer to a loose term for the fourth generation and five generation of cellular communications In one implementation, the radio 111 is connected to antenna array 112. The antenna array may comprise two or more antenna elements. The antenna elements may work individually or work together as a single antenna to transmit and/or receive radio waves. For example, as shown in FIG. 1, the antenna array 112 may include antenna elements 112a and 112b. The antenna elements 112a and 112b can be connected to each other and work together as one antenna element to transmit and/or receive the first signal transmitted by the wireless communication device 120. The antenna elements 112a and 112b can work individually so that each of the antenna elements 112a and 112b can transmit and/or receive the first signal transmitted by the wireless communication device 120 respectively. In one embodiment, the antenna elements may be arranged half wavelength away for each other in the antenna array 111. In this embodiment, CSI to be generated by the radio 111 can have good phase information for calculating AOA. In another embodiment, the antenna elements may be arranged less than half wavelength away for each other in the antenna array 111. In another embodiment, the antenna elements may be arranged more than half wavelength away for each other in the antenna array 111.

In one implementation, the radio 111 may be connected to the antenna array 112, as shown in FIG. 1. In one implementation, the radio 111 may integrate with the antenna array 112.

In one implementation, the movable device 110 comprises a memory 116. The memory 116 may be a device or a system that can be used to store information for immediate use. The memory 116 may be a related computer hardware and digital electronic device. The memory 116 may be volatile memory and/or non-volatile memory. The memory 116 may store information indicating received signal strength indicator (RSSI), basic service set identifier (BSSID), channel state information (CSI), timestamp, IP address, Global Positioning System (GPS) sensor and/or a pedestrian dead reckoning (PDR). The memory 116 may store a database comprising the information indicating RSSI, BSSID, CSI, timestamp, IP address, GPS, and/or PRD. For example, as shown in FIG. 1, the memory 116 may store a database.

In one implementation, the movable device 110 comprises a processor 113. The processor 113 may be a central processor unit (CPU), a central processor, a microprocessor, and/or a main processor. The processor 113 may be array processors or vector processors having multiple processors that may operate in parallel. For example, as shown in FIG. 1, the processor 113 may be a CPU. In some implements, the CPU may be integrated in an integrated circuit (IC) and the IC may contain memory, peripheral interfaces, and other components of a computer, a tablet and/or a laptop. In some implements, the processor 113 is connected to the radio 111. The processor 113 may receive the information measured/processed by the radio 111 and further process based on the information processed by the radio 111. In some implementation, the processor 113 may connect with the memory 116 and may store the received information and/or the processed information into the memory 116, as shown in FIG. 1.

In one implementation, the processor 111 can be configured to calculate a first angle of arrival (AOA) based on the first signal and a reference direction, and a second AOA based on the second signal and the reference direction. The first AOA is defined by the first direction and the reference direction, and the second AOA is defined by the second direction and the reference direction. In some implementations, the reference direction may be related to a facing direction of the antenna array 112. For example, as shown in FIG. 1, the antenna elements, e.g., 112a and 112b, of the antenna array 112 may be arranged in parallel to each other in one plane 119, and forms one facing direction 118. The facing direction 118 is perpendicular to the plane 119. The reference direction is parallel to the facing direction 118. In some implementations, the AOA may be an angle of incoming signals received by the antenna elements relative to the reference direction. For example, as shown in FIG. 1, the movable device 110 is located at the first position. The wireless communication device 120 transmits the signals at the fixed position. The movable device 110 receives the first signal transmitted from the first direction via the radio 111 and/or the antenna array 112. The first AOA is defined by the first direction and the reference direction when the movable device 110 is at the first position. Similarly, the movable device 110 receives the second signal transmitted from the second direction and the second AOA is defined by the second direction and the reference direction when the movable device 110 is located at the second position. In some implementation, as shown in FIG. 1, the radio 111 may send CSI data, RSS and timestamp information to the processor 113 for calculating AOA.

In one implementation, the processor 113 is configured to estimate the fixed position of the wireless communication device 120 based on the first AOA, the second AOA, the first position and the second position. The fixed position may include the distance between the movable device 110 and the wireless communication device 120, the coordinates of the wireless communication device 120 relative to the positions of the movable device 110, and/or the coordinates of the wireless communication device 120 in a map or floorplan.

In one implementation, the movable device 110 may comprise driving mechanism 117. The driving mechanism 117 can drive the movable device 110 to move from one position to another position. For example, as shown in FIG. 1, the driving mechanism 117 may comprise a motor, two or more wheels and wheel holders. The driving mechanism 117 can drive the movable device 110 from the first position to the second position.

In one implementation, the movable device 110 may comprise a clock to record the timestamp of the first signal and the second signal.

In one implementation, the movable device 110 may comprise a network interface for transferring data to other processors.

In one implementation, the reference direction is parallel or perpendicular to a facing direction of the antenna array 112. For example, the reference direction is parallel to the facing direction 118 of the antenna array 112. For another example, the reference direction is perpendicular to the facing direction 118 of the antenna array 112. For the other example, the reference direction may be angled to the facing direction 118 of the antenna array 112.

In one implementation, the wireless communication device 120 comprises a Wi-Fi access point or a bluetooth beacon. In another implementation, the wireless communication device 120 may comprise WiMax device, Ultra-wideband device, LoRa device, Zigbee device, 4G device or 5G device.

In one implementation, the movable device 110 comprises a Global Positioning System (GPS) sensor 114 and/or a pedestrian dead reckoning (PDR) sensor 115. The GPS sensor 113 and the PDR sensor 115 may connect to the processor 113. The GPS can provide position information including geolocation, e.g., latitude and longitude, and time information with regard to the movable device 110 to the GPS sensor 114. The PDR sensor 115 can measure the movement of the movable device 110, including the position, direction and speed of the movement, by using gyroscope and accelerometers. For example, as shown in FIG. 1, the movable device 110 may comprise a GPS sensor. The position information including geolocation and the time information of the movable device 110 can be obtained from GPS by the GPS sensor 114. The position information including geolocation may comprise the latitude and longitude data of the movable device 110. The fixed position of the wireless communication device 120 can be estimated based on the data obtained by the GPS senor 114 and the AOA, and therefore only two measurements may be needed. For another example, as shown in FIG. 1, the movable device 110 may comprise the PDR sensor 115. When the movable device 110 moves from the first position to the second position, the movement data of the movable device 110, including the position, direction and speed of the movable device 110, can be measured. The fixed position of the wireless communication device 120 can be estimated based on the data obtained by the PDR sensor 115 and the AOA, and therefore only two measurements may be needed.

In one implementation, the processor 113 is configured to obtain the first position and the second position using the GPS sensor or the PDR sensor. In some implementation, the first position information including geolocation and the time information of the movable device 110 can be obtained from GPS by the GPS sensor 114 when the movable device 110 is located at the first position. The first position information including geolocation may comprise the latitude and longitude data of the movable device 110 at the first position. Similarly, the second position information including geolocation and the time information of the movable device 110 can be obtained from GPS by the GPS sensor 114 when the movable device 110 is at the second position. The second position information including geolocation may comprise the latitude and longitude data of the movable device 110 at the second position. The processor 113 may obtain the first position according to the first position information, and obtain the second position according to the second position information. In one implementation that the movable device 110 may comprise the PDR sensor 115. When the movable device 110 moves from the first position to the second position, the movement data of the movable device 110, including the position, direction and speed of the movable device 110, can be measured by the PDR sensor. The processor 113 may obtain the first position and the second position based on the movement data of the movable device 110.

In one implementation, the first signal and the second signal may comprise information indicating received signal strength indicator (RSSI), basic service set identifier (BSSID), and channel state information (CSI) received at the first position and second position respectively. The first signal received at the first position may comprise the first set of information indicating RSSI, BSSID and CSI. The radio 111 may generate the first CSI, the first RSSI and/or the first timestamp records for the wireless communication device 120 at the first position based on the first set of information. When the movable device 110 is at the second position, the second signal received may comprise the second set of information indicating RSSI, BSSID and CSI. The radio 111 can may generate the second CSI, the second RSSI and/or the second timestamp records for the wireless communication device 120 at the second position based on the second set of information. The BSSID may be associated with the wireless communication device 120.

In some implementations, the first CSI, the first RSSI, the first timestamp records, the second CSI, the second RSSI, the second timestamp records and the BSSID may be sent to the processor 113. The reference direction, the first direction and the second direction may also be sent to the processor 113. The processor 113 can calculate the first AOA by using advanced signal process algorithms based the first CSI, and can estimate the distance between the wireless communication device 120 and the movable device 110 at the first position based on the first RSSI. Similarly, the processor 113 can calculate the second AOA by using advanced signal process algorithms based the second CSI, and can estimate the distance between the wireless communication device 120 and the movable device 110 at the second position based on the second RSSI. The processor may estimate the fixed position of the wireless communication device 120 based on the first AOA, the second AOA, the first position and the second position.

In one implementation, the processor 113 is further configured to store the fix position of the wireless communication device 120 and the first signal including a basic service set identifier (BSSID) of the wireless communication device into a database stored in the memory.

In one implementation, the processor 113 being configured to estimate the fixed position of the wireless communication device 120 includes being configured to calculate coordinates indicating the fixed position of the wireless communication device 120 based on the first AOA, the second AOA, the first position and the second position. For example, the fixed position of the wireless communication device 120 include the coordinates indicating the fixed position of the wireless communication device 120. When the processor 113 is configured to estimate the fixed position of the wireless communication device 120, the processor 113 may be configured to calculate the coordinates indicating the fixed position of the wireless communication device 120.

In one exemplary implementation, a system 100 may comprise at least one wireless communication device deployed at a fixed position, as shown in FIG. 1. The at least one wireless communication device may be the wireless communication device 120 as described above.

FIG. 2 illustrates a movable device using AOA to estimating positions of one or more wireless communication devices, according to exemplary implementations of the present disclosure.

In one exemplary implementation, a system may comprise a movable device 200, and one or more communication devices. As shown in FIG. 2, the movable device 200 may be the movable device 110 as described above with the reference to FIG. 1, and can estimate position of two wireless communication devices, i.e., an AP device 201 and a Bluetooth beacon device 202. The movable device 200 may be a fine-grained wireless device that be capable of scanning, transmitting, and receiving signals transmitted by Wi-Fi, Bluetooth, WiMax, Ultra-wideband, LoRa, Zigbee, and/or 4G/5G devices. The AP device 201 may be deployed at a first fixed position, and communicate with the movable device 200 from a first direction. The Bluetooth beacon device 202 may be deployed at a second position and communicate with the movable device 200 from a second direction.

In one implementation, the movable device 200 can measure and calculate the AOA of a received wireless signal in one-degree level. For example, as shown in FIG. 2, the movable device can measure and calculate a first AOA 211 of the AP device 201 based on the first signal transmitted by the AP device 201 from the first direction. The movable device 200 can measure and calculate a second AOA 212 based on the second signal transmitted by the Bluetooth beacon device 202 from the second direction.

In one implementation, the movable device 200 may have a facing direction 210 which is defined by the antenna array 112 as described above with reference to FIG. 1. The facing direction 210 may be the same as an AOA baseline. For example, as shown in FIG. 2, the movable device 200 may have the facing direction 210. The first AOA 211 may be defined by the first direction and the facing direction 210, Similarly, the second AOA 212 may be defined by the second direction and the facing direction 210.

In one implementation, the movable device 200 can measure and calculate RSS for the signals transmitted by the AP device 200 and the Bluetooth device 202. For example, as shown in FIG. 2, the first signal may contain information indicating CSI1, RSS1 and BSSID1, based on which the movable device 200 can measure and calculate CSI1 and RSS1. The second signal may contain information indicating CSI2, RSS2 and BSSID 2, based on which the movable device 200 can measure and calculate CSI2 and RSS2.

In one implementation, the facing direction 210 may be consider 0 degree in the local coordination system of the movable device 200. When receiving the first signal, the movable device 200 is able to use CSI1 to make the first AOA estimation $\alpha_1$. Also, the movable device 200 is able to use RSS1 to estimate the distance between the AP device 201 and itself. Similarly, when receiving the second signal, the movable device 200 is able to use CSI2 to make the second AOA estimation $\alpha_2$. Also, the movable device 200 is able to use RSS2 to estimate the distance between the Bluetooth beacon device 202 and itself.

In one implementation, use of RSS to estimate the distance between the movable device 200 and the one or more wireless communication device, e.g., the AP device 201 and the Bluetooth device 202, may be this formula:

$$Dist = 10^{\frac{a-RSS}{b}}$$

Where a is the max RSS value the movable device received, b is the attenuation constant.

For example, a1 is the max RSS1 value the movable device 200 received, and b1 is the attenuation constant. Therefore, the first distance DIST1 between the movable device 200 and the AP device 201 may be estimated by using this formular:

$$Dist1 = 10^{\frac{a1-RSS1}{b1}}$$

Analogously, a2 is the max RSS2 value the movable device 200 received, and b2 is the attenuation constant. Therefore, the second distance DIST2 between the movable device 200 and the Bluetooth beacon device 202 may be estimated by using this formular:

$$Dist2 = 10^{\frac{a2-RSS2}{b2}}$$

In one implementation, the movable device 200 can estimate the fixed positions of the one or more wireless communication devices, e.g., the AP device 201 and the Bluetooth beacon device 202, by using AOA and DIST. For example, the movable device 200 can estimate the first fixed positions of the AP device 201 by using the first AOA and the first distance DIST1. Similarly, the movable device 200 can also estimate the second fixed positions of the Bluetooth beacon device 202 by using the second AOA and the second distance DIST2. In one implementation, the first fixed position and the second fixed position may be coordinates in the local coordination system of the movable device 200.

FIG. 3 illustrates a movable device using PDR sensors to estimate position of a wireless communication device, according to exemplary implementations of the present disclosure.

In one exemplary implementation, a system may comprise a movable device as described in FIG. 1, and a wireless communication device as described above with reference to FIG. 1. The movable device can get accurate position calculation for the wireless communication device with PDR sensor which is described in FIG. 1. For example, as shown in FIG. 3, the system may comprise a movable device 300 and an AP device 301. The movable device 300 may comprise a PRD sensor.

In one implementation, the system may comprise coordinate plane. For example, as shown in FIG. 3, the system may comprise XY coordinate plane. The coordinate axis X is the horizontal coordinate axis 310 of the XY coordinate plane, and the coordinate axis Y is the vertical coordinate 311 of the XY coordinate plane. The movable device 300 may have a facing direction as described in FIGS. 1 and 2. For example, the facing direction of the movable device 300 is parallel to the vertical coordinate 311.

In one implementation, the movable device 300 is located at the first position which is defined as the origin point $P_0=(0,0)$ of the XY coordinate plane. The movable device 300 may communicate with the AP device 301, including receiving the first signal transmitted by the AP device 301 from the first direction, and calculate the first AOA $\alpha$, as described in FIGS. 1 and 2. For example, as shown in FIG. 3, the first AOA $\alpha$ is defined by the facing direction and the first direction.

In this implementation, the movable 300 then moves to $P_1$, and can receive the second signal transmitted by the AP device 301 from the second direction. The movable device 300 can also calculate the second AOA $\beta$, as described in FIGS. 1 and 2. The second AOA $\beta$ may be defined by the facing direction and the second direction, as shown in FIG. 3. In addition, the second position of the movable device 300 can be calculated by the PDR sensor using the existing technologies. For example, as shown in FIG. 3, the PDR sensor can calculate that the movable device 300 has moved d meters, on a $\gamma$ degree direction clockwise from the horizontal axis 310.

In this implementation, based on these two measurements of the first AOA $\alpha$ and the second AOA $\beta$, the fixed position of the AP device 301 P (x,y) can be calculated by:

$$|\overrightarrow{PP_0}| = \left| \frac{\sin\left(\frac{\pi}{2} - \gamma - \beta\right) \times d}{\sin(\alpha + \beta)} \right|$$

$$x = |\overrightarrow{PP_0}| \times \sin(\alpha)$$

$$y = |\overrightarrow{PP_0}| \times \cos(\alpha)$$

FIG. 4 illustrates a movable device using a map or a floorplan to estimate position of a wireless communication system, according to exemplary implementations of the present disclosure.

In one exemplary implementation, a system may comprise a movable device as described in FIG. 1, and a wireless communication device as described in FIG. 1. The movable device can get accurate position calculation for the wireless communication device by using a map or a floorplan where the movable device is. For example, as shown in FIG. 4, the system may comprise a movable device 400 and an AP device 401. The position of the movable device 400 may be referred in the map without the use of the PDR sensor.

In one implementation, the map may comprise coordinate plane. For example, as shown in FIG. 4, the map may comprise a XY coordinate plane. The coordinate axis X is the horizontal coordinate axis 410 of the XY coordinate plane, and the coordinate axis Y is the vertical coordinate 411 of the XY coordinate plane. The movable device 400 may have a travel direction 412. The movable device 400 may also have a facing direction as described in FIGS. 1 and 2. For example, as shown in FIG. 4, the movable device 400 may have a travel direction 412 and the facing direction is parallel to the travel direction 412. The travel direction 412 may be inclined to the horizontal coordinate axis 410 with an angle $\theta$. The AP device 401 may be deployed in the map at a fixed position P(x,y).

In one implementation, the movable device 400 may be placed at a first position $P_1(x_1,y_1)$ on the map, as shown in FIG. 4. The movable device 400 can measure and receive the first signal transmitted by the AP device 401 from a first direction 413. The movable device 400 may calculate the first AOA $\alpha_1$ in the way as described in FIGS. 1 and 2. The first AOA $\alpha_1$ is defined by the travel direction 412 and the first direction 413.

In this implementation, the movable device may move to a second position $P_2(x_2,y_2)$ along the travel direction 412 to measure a second AOA $\alpha_2$. As the travel direction 412 is parallel to the facing direction, the first AOA $\alpha_1$ measured at $P_1$ will be the same as the angle between the facing direction 412 and the first direction 413. The movable device 400 can measure and receive the second signal transmitted by the AP device 401 from a second direction, and can calculate the second AOA $\alpha_2$ in the way as described in FIGS. 1 and 2. 1 and 2.

In this implementation, a computer device with a screen or monitor will be used to show a map of the given locations. The scanning device 400 will be presented in the map with its coordinates $P_1(x_1,y_1)$. The travel direction 412 will be shown in the screen and the movable device 400 will have its facing direction in parallel with the travel direction 412. Because of this, the AOA baseline will be parallel with the travel direction 412. The movable device 400 will first start a measurement at $P_1$, and the first AOA $\alpha_1$ will be calculated. Then the movable device 400 will go to $P_2(x_2,y_2)$ for a new measurement, and get the second AOA $\alpha_2$.

First, we can calculate the angle of the slope ($\theta$) of the travel direction 412 by $P_1$ and $P_2$.

$$\theta = \tan^{-1}\left(\frac{y_2 - y_1}{x_2 - x_1}\right)$$

Then use the known $\alpha_1$, $\alpha_2$ and $\theta$, we can create two liner equations with only two variables, x and y.

$$\tan(\theta - \alpha_1) = \frac{y - y_1}{x - x_1}$$

$$\tan(\theta - \alpha_2) = \frac{y - y_2}{x - x_2}$$

In the end, the fixed position of the AP device 401 can be obtained, and therefore only two measurements may be needed.

FIG. 5 illustrates a method to estimate the position of a new movable device in a database, which has mapped the coordinates of fixed positions of wireless communication devices, according to exemplary implementations of the present disclosure.

In one exemplary implementation, a system may comprise a map, 3 or more AP devices mapped in the map and a new movable device 500 as described in the above figures. The map may comprise coordinate plane. The positions of each of the AP devices in the map may been calculated with the AOAs as described in above figures. The new movable device 500 is able to position itself in the map using these AP devices with the AOAs as described in above figures. For example, as shown in FIG. 5, the map may comprise a XY coordinate plane. The coordinate axis X is the horizontal coordinate axis 501 of the XY coordinate plane, and the coordinate axis Y is the vertical coordinate 502 of the XY coordinate plane. The new movable device 500 capable of measuring an AOA of an incoming signal may be located at the initial position 501 (x, y). Three AP devices, AP1, AP2, and AP3, are mapped in the map with $P_1(x_1,y_1)$, $P_2(x_2,y_2)$ and $P_3(x_3,y_3)$, respectively.

In one implementation, the movable device 500 may have an AOA baseline 503. The AOA baseline 503 may have a slope angle θ 510 which is defined by the horizontal coordinate axis 501 and the AOA baseline 503, as shown in FIG. 5. In one implementation, the new movable device 500 is able to measure the three AOAs for AP1, AP2 and AP3 as $\alpha_1$, $\alpha_2$, and $\alpha_3$ respectively. For example, as shown in FIG. 5, the new movable device 500 is able to measure the first AOA $\alpha_1$ according to the first signal transmitted by the first AP device AP1 for the first direction. Similarly, the new movable device 500 is able to measure the second AOA $\alpha_2$ according to the second signal transmitted by the second AP device AP2 for the second direction, and to measure the third AOA $\alpha_3$ according to the third signal transmitted by the third AP device AP3 for the third direction.

In this implementation, the coordinates of the new movable device 500 (x,y) can be obtain via:

$$\tan(\theta - \alpha_1) = \frac{y - y_1}{x - x_1} = \frac{\tan\theta - \tan\alpha_1}{1 + \tan\alpha_1 \tan\theta}$$

$$\tan(\theta - \alpha_2) = \frac{y - y_2}{x - x_2} = \frac{\tan\theta - \tan\alpha_2}{1 + \tan\alpha_2 \tan\theta}$$

$$\tan(\theta - \alpha_3) = \frac{y - y_3}{x - x_3} = \frac{\tan\theta - \tan\alpha_3}{1 + \tan\alpha_3 \tan\theta}$$

Then x, y and tan(θ) can be solved by having 3 linear equations with 3 variables:

$$\tan(\theta) = \frac{(y - y_1) + \tan\alpha_1(x - x_1)}{(x - x_1) - \tan\alpha_1(y - y_1)}$$

-continued $$\frac{y - y_2}{x - x_2} = \frac{\tan\theta - \tan\alpha_2}{1 + \tan\alpha_2 \tan\theta}$$

$$\frac{y - y_3}{x - x_3} = \frac{\tan\theta - \tan\alpha_3}{1 + \tan\alpha_3 \tan\theta}$$

In the end, the initial position of the new movable device 500 can be estimated, including the coordinates (x,y).

FIG. 6*a* illustrates a flowchart illustrating the collection of signal data of a wireless communication device in an exemplary method, according to exemplary implementations of the present disclosure.

In one exemplary implementation of the method, the method 600 may be performed by the movable device 110, which is described above with reference to FIG. 1. The movable device 110 can discover available APs or beacons and use standard protocol frames to generate CSI data. The APs or beacon may be the wireless communication device 120 comprising AP device or beacon device as described above with reference to FIG. 1.

The movable device 110 may start at Location 1, as shown in FIG. 6*a*.

In some implementations, as shown in FIG. 6*a*, at Step 601, the movable device 110 will do a quick scan on all available channels in the 2.4 Ghz, 5 Ghz and 6 Ghz, when coming to a new location. On each channel, the movable device 110 will listen on all available Wi-Fi and Bluetooth channels for signals. The beacon packets will include AP's BSSID. The radio of the movable device 110 is also able to get the receiving signal strength or RSSI. Another way the movable device 110 can do is to send out broadcast probe requests on each channel and listen for the probe responses from APs/Beacons.

In one implementation, the movable device 110 may send broadcast request (generically and generally to all possible APs in the nearby area) and receive from APs the BSSID information. The radio of the movable device 110 may detect and deduce which channel an AP is on. Afterwards, the movable device 110 may send a unicast request or frame/packet, requesting acknowledgement from the AP so the radio of the movable device 110 can generate channel state information CSI. The radio of the movable device 110 can process and distill information from the response/wave sent back from the AP. The movable device 110 may receive responses and generate CSI, RSSI and timestamp records for each AP BSSID.

At Step 602, when the movable device 110 receives either broadcast signals or probe responses from APs, the movable device 110 will create a record. The record may include the receiving timestamp (TS), BSSID in the beacon and probe response message, RSSI from the receiving antenna, etc. The movable device 110 may select a group of APs/Beacons based on signal quality, i.e., RSSI and channel distribution.

At Step 603, the movable device 110 may start to pick one AP or Beacon and send a unicast frame to the chosen target. The peer AP/Beacon can be any third-party AP/Beacon, so the movable device 110 may need to send a frame that the AP must reply. In the same time, sending the frame that the AP must reply should not affect the normal operation of the AP, and have very little performance impact on the wireless network. In one instance, A 802.11 Null data or QoS Null data frame can be used for this purpose. In this instance, the 802.11 standard specification may require an AP to send an acknowledge (ACK) frame back when it receives a Null data frame. In another instance, a 802.11 unicast probe request can be used. The AP will respond with an ACK response based on the 802.11 standard. Both frames are small and have little performance impact.

At Step 604, the AP may send the response back. The radio of the movable device 110 may be able to generate CSI for these frames, along with RSSI, arrival time, frame sequence number, etc. The movable device 110 may be able to collect, store and forward these data for further process.

In Step 605, the movable device 110 will repeat Steps 603 to 605 until the movable device 110 may get responses from all selected APs/Beacons.

At Step 606, the movable device 110 may repeat Steps 603 to 605 until the movable device 110 may get enough responses at Location 1. For every BSSID received, the movable device 110 may save BSSID, CSI, the coordinates of Location 1 and the direction of the movable device.

At Step 607, the movable device 110 may move to a new Location 2 to restart Steps 601 to 606.

FIG. 6b illustrates a flowchart illustrating the generation of a database using the signal data collected by the wireless communication device in an exemplary method, according to other exemplary implementations of the present disclosure.

In one exemplary implementation of the method, the method 610 may be performed by the movable device 110, which is described above with reference to FIG. 1. The AP may be the wireless communication device 120 comprising AP device as described above with reference to FIG. 1.

In some implementations, as shown in FIG. 6b, at Step 611, the movable device 110 may find all saved CSIs for BSSID AP1. The CSIs may be generated by the steps as described above with reference to FIG. 6b. The BSSID APs may be obtained by the steps as described above with reference to FIG. 6b. Then the movable device 110 may calculated AOAs for AP1 according to the saved CSIs, as described above with reference to FIGS. 1-4.

At Step 612, the movable device 110 may use the method as described above with the reference to FIG. 4 to calculate the coordinates of AP1.

At Step 613, the movable device 110 may store BSSID of AP1, and the coordinates of AP1 into a database as described above with reference to FIG. 1.

FIG. 7 illustrates a flowchart illustrating the estimation of the position of a new movable device in an exemplary method, according to exemplary implementations of the present disclosure.

In one exemplary implementation of the method, the method 700 may be performed by the movable device 110, which is described above with reference to FIG. 1. The movable device 110 can discover available APs or beacons and use standard protocol frames to generate CSI data. The APs or beacons may be the wireless communication device 120 comprising AP device or beacon device as described above with reference to FIG. 1.

The movable device 110 may be located at a Location and start, as shown in FIG. 6b.

In some implementations, as shown in FIG. 7, at Step 701, the movable device 110 can scan all available Wi-Fi or BLE channels and discover APs/Beacons with their BSSIDs. The APs/Beacons may send back the BSSID information to the mobile device 110.

At Step 702, the mobile device 110 may send a request to each AP/Beacon. The request may comprise an 802.11 Null Data Frame.

At Step 703, the movable device 110 may receive a response from an AP/Beacon. The movable device 110 may use the response to generate the relevant RSSI, CSI and TOF if available that are associated with a particular BSSID.

At Step 704, the movable device 110 may evaluate if there are more APs/Beacons. If yes, the movable device 110 will repeat Steps 702 to 704. If no, the movable device 110 will move to Step 705.

At Step 705, the movable device 110 uses the BSSIDs as index keys to query the AP/Beacon Database stored locally or remotely. The AP/Beacon Database has already been generated by the methods as described above with the reference to FIG. 6a.

At Step 706, the movable device 110 may receive the coordinates of APs/Beacons with calculated AOA, TOF or RSSI from the AP/Beacon Database, and may use them to get the coordinates of the movable device 110.

FIG. 8 illustrates a flowchart illustrating the estimation of the position of a wireless communication device in an exemplary method, according to exemplary implementations of the present disclosure.

In one exemplary implementation of the method, the method 800 may be performed by the movable device 110, which is described above with reference to FIG. 1.

In some implementations, as shown at Step 801, the method 800 may comprise receiving, by the movable device 110 at the first position, a first signal transmitted from a first direction by a wireless communication device to the movable device 110. The wireless communication device may be deployed at a fixed position. The wireless communication device may be the wireless communication device 120 as described above with reference to FIG. 1.

In some implementations, as shown at Step 802, the method 800 may comprise receiving, by the movable device 110 at a second position, a second signal transmitted from a second direction by the wireless communication device to the movable device 110.

In some implementations, as shown at Step 803, the method 800 may comprise calculating, by the movable device 110, a first angle of arrival (AOA) based on the first signal and a reference direction, and a second AOA based on the second signal and the reference direction. The first AOA may be defined by the first direction and the reference direction, and the second AOA may be defined by the second direction and the reference direction.

In some implementations, as shown at Step 804, the method 800 may comprise estimating the fixed position of the wireless communication device based on the first AOA, the second AOA, the first position and the second position.

Certain implementations may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular implementations only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A movable device, comprising:
a radio connected to an antenna array, wherein the radio is configured to:
receive, by the movable device at a first position, a first signal transmitted from a first direction by a wireless communication device to the movable device, the wireless communication device being deployed at a fixed position; and
receive, by the movable device at a second position, a second signal transmitted from a second direction by the wireless communication device to the movable device;
a memory; and
a processor configured to:
calculate a first angle of arrival (AOA) based on the first signal and a reference direction, and a second AOA based on the second signal and the reference direction, wherein the first AOA is defined by the first direction and the reference direction, and the second AOA is defined by the second direction and the reference direction; and
estimate the fixed position of the wireless communication device based on the first AOA, the second AOA, the first position and the second position,
wherein the first signal and the second signal comprise information indicating received signal strength indicator (RSSI), basic service set identifier (BSSID), and channel state information (CSI) received at the first position and the second position.

2. The movable device of claim 1, wherein the reference direction is parallel or perpendicular to a facing direction of the antenna array.

3. The movable device of claim 1, wherein the wireless communication device comprises a Wi-Fi access point or a bluetooth beacon.

4. The movable device of claim 1, further comprising:
a Global Positioning System (GPS) sensor or a pedestrian dead reckoning (PDR) sensor, wherein the processor is further configured to:
obtain the first position and the second position using the GPS sensor or the PDR sensor.

5. The movable device of claim 1, wherein the processor is further configured to store the fix position of the wireless communication device and the first signal including a basic service set identifier (BSSID) of the wireless communication device into a database stored in the memory.

6. The movable device of claim 1, wherein the processor being configured to estimate the fixed position of the wireless communication device includes being configured to calculate coordinates indicating the fixed position of the wireless communication device based on the first AOA, the second AOA, the first position and the second position.

7. A system, comprising:
at least one wireless communication device deployed at a fixed position; and a movable device, wherein the movable device comprises:
a radio connected to an antenna array, wherein the radio is configured to:
receive, by the movable device at a first position, a first signal transmitted from a first direction by the at least one wireless communication device to the movable device, the at least one wireless communication device being deployed at a fixed position; and
receive, by the movable device at a second position, a second signal transmitted from a second direction by the at least one wireless communication device to the movable device;
a memory; and
a processor configured to:
calculate a first angle of arrival (AOA) based on the first signal and a reference direction, and a second AOA based on the second signal and the reference direction, wherein the first AOA is defined by the first direction and the reference direction, and the second AOA is defined by the second direction and the reference direction;
estimate the fixed position of the wireless communication device based on the first AOA, the second AOA, the first position and the second position; and
store the fix position of the wireless communication device and the first signal including a basic service set identifier (BSSID) of the at least one wireless communication device into a database stored in the memory.

8. The system of claim 7, wherein the reference direction is parallel or perpendicular to a facing direction of the antenna array.

9. The system of claim 7, wherein the at least one wireless communication device comprises a Wi-Fi access point or a bluetooth beacon.

10. The system of claim 7, further comprising:
a Global Positioning System (GPS) sensor or a pedestrian dead reckoning (PDR) sensor,
wherein the processor is further configured to:
obtain the first position and the second position using the GPS sensor or the PDR sensor.

11. The system of claim 7, wherein the first signal and the second signal comprise information indicating received signal strength indicator (RSSI), basic service set identifier (BSSID), and channel state information (CSI) received at the first position and second position respectively.

12. The system of claim 7, wherein the processor being configured to estimate the fixed position of the at least one wireless communication device includes being configured to calculate coordinates indicating the fixed position of the at least one wireless communication device based on the first AOA, the second AOA, the first position and the second position.

13. A method comprising:
receiving, by a movable device at a first position, a first signal transmitted from a first direction by a wireless communication device to the movable device, the wireless communication device being deployed at a fixed position;
receiving, by the movable device at a second position, a second signal transmitted from a second direction by the wireless communication device to the movable device;
calculating, by the movable device, a first angle of arrival (AOA) based on the first signal and a reference direction, and a second AOA based on the second signal and the reference direction, wherein the first AOA is defined by the first direction and the reference direction, and the second AOA is defined by the second direction and the reference direction; and
estimating the fixed position of the wireless communication device based on the first AOA, the second AOA, the first position and the second position;
wherein the first signal and the second signal comprise information indicating received signal strength indicator (RSSI), basic service set identifier (BSSID), and channel state information (CSI) received at the first position and second position respectively.

14. The method of claim 13, wherein the movable device comprises an antenna array, and wherein the reference direction is parallel or perpendicular to a facing direction of the antenna array.

15. The method of claim 13, wherein the wireless communication device comprises a Wi-Fi access point or a bluetooth beacon.

16. The method of claim 13, further comprising obtaining the first position and the second position using a Global Positioning System (GPS) sensor or a pedestrian dead reckoning (PDR) sensor.

17. The method of claim 13, further comprising storing the fix position of the wireless communication device and the first signal including a basic service set identifier (B S SID) of the wireless communication device into a database stored in a memory of the wireless communication device.

* * * * *